United States Patent [19]

von der Heide

[11] Patent Number: 4,666,091

[45] Date of Patent: May 19, 1987

[54] PICKUP AND DELIVERY TRUCK FOR SILAGE, STRAW AND SIMILAR MATERIAL

[76] Inventor: Hans von der Heide, Ibbenburener Strasse 17, 4533 Laggenbeck, Fed. Rep. of Germany

[21] Appl. No.: 850,422

[22] Filed: Apr. 7, 1986

Related U.S. Application Data

[63] Continuation of Ser. No. 511,307, Jul. 6, 1983, abandoned.

[30] Foreign Application Priority Data

Sep. 3, 1982 [EP] European Pat. Off. ........ 82108136.1

[51] Int. Cl.⁴ ............................................. A01F 25/20
[52] U.S. Cl. .............................. 241/101.7; 241/101 A
[58] Field of Search ................ 241/101.7, 101 A, 222, 241/166, 167; 414/469, 473, 785; 83/928, 768

[56] References Cited

U.S. PATENT DOCUMENTS

| | | | |
|---|---|---|---|
| 4,367,855 | 1/1983 | Von Der Heide | 241/101.7 |
| 4,387,857 | 6/1983 | Young et al. | 241/101.7 X |

FOREIGN PATENT DOCUMENTS

| | | | |
|---|---|---|---|
| 35435 | 9/1981 | European Pat. Off. | 241/101.7 |
| 2303341 | 8/1973 | Fed. Rep. of Germany | 241/101.7 |
| 2307689 | 3/1977 | Fed. Rep. of Germany | . |
| 2810676 | 9/1979 | Fed. Rep. of Germany | 241/101.7 |
| 3033824 | 12/1981 | Fed. Rep. of Germany | . |
| 1948187 | 7/1982 | Fed. Rep. of Germany | 241/101.7 |
| 8005825 | 3/1982 | Netherlands | 241/101.7 |
| 2025758 | 1/1980 | United Kingdom | 241/101.7 |
| 2048654 | 12/1980 | United Kingdom | 241/101.7 |
| 377478 | 6/1973 | U.S.S.R. | 299/67 |

*Primary Examiner*—Mark Rosenbaum
*Attorney, Agent, or Firm*—Felfe & Lynch

[57] ABSTRACT

A pickup and delivery truck for silage, straw and similar material has a loading space with a scraper feeder, floor for cut silage blocks and a conveyer which laterally discharges the material. The silage cutter comprises an elongated knife on a U-shaped bridge and prongs extending in a plane parallel to the bridge and spaced therefrom by a distance which approximately corresponds to the length of the elongated knife for picking up material. The prongs are adapted to be raised and tilted above the loading space to dump the material carried by the prongs into the loading space.

8 Claims, 4 Drawing Figures

PICKUP AND DELIVERY TRUCK FOR SILAGE, STRAW AND SIMILAR MATERIAL

This application is a continuation of application Ser. No. 511,307, filed July 6, 1983 now abandoned.

BACKGROUND OF THE INVENTION

The invention relates to a pickup and delivery truck for silage, straw and similar material having a loading space with a scraper feeder floor, means for cutting silage blocks and means for laterally discharging the material.

While trucks of this type, as described in the Applicant's German patent application No. P 30 33 824.0, have proved satisfactory, they have the drawback that, in order to pick up fodder, the fodder must be in cut out blocks. Moreover, they are relatively heavy and expensive to manufacture.

Moreover, silage cutters of the type described in the applicant's German Pat. No. 2,307,689, for example, are known. These silage cutters, however, have the disadvantage that the block which has been cut out and laid down must be manually comminuted, which means that the material cannot be discharged directly into a trough from the silage cutter. Besides, these known devices do not appear to be capable of handling material other than silage.

SUMMARY OF THE INVENTION

The object of the invention thus is to provide a pickup and delivery truck for silage, straw and similar material which is self-propelled or pulled or pushed by a tractor or similar drawing vehicle, which permits silage blocks to be cut out and distributed even in cramped spaces, which is capable of of picking up and distributing also straw, hay and similar material, and which, finally, is able to pick up and distribute also bulk material such as beet chips, wet grain and the like.

The pickup and delivery truck in accordance with the invention should further be of simple construction, adapted to be manufactured economically, and if self-propelled, maneuverable in a minimum of space.

In accordance with the invention, this object is accomplished in that the silage cutter on a truck comprises an elongated knife movable on a U-shaped bridge, and prongs, extending in a plane parallel to the bridge and spaced therefrom by a distance which approximately corresponds to the length of the elongated knife, for picking up material. The cutter is adapted to be raised and tilted above a loading space to permit the material carried by the prongs to be dumped into the loading space.

The material picked up is preferably discharged from the loading space by a scraper conveyor belt and a belt conveyor discharging sideways.

Also preferably, placing a metal sheet on the prongs of the silage cutter will enable the latter to execute a rocking motion whereby bulk material such as draff, beets, beet chips and wet grain can be picked up and distributed as desired.

The pickup and delivery truck in accordance with the invention further permits large bales of hay and straw as well as corncob mix to be processed. Since the handling and processing of large bales in particular are extremely difficult and costly to the farmer, the truck of the invention may well be regarded as an ideal solution to the problems involved, given its additional advantages and its simple design.

BRIEF DESCRIPTION OF THE DRAWINGS

An embodiment of the invention will now be described in greater detail with reference to the accompanying drawings, wherein.

DETAILED DESCRIPTION OF THE INVENTION

Figure 1:
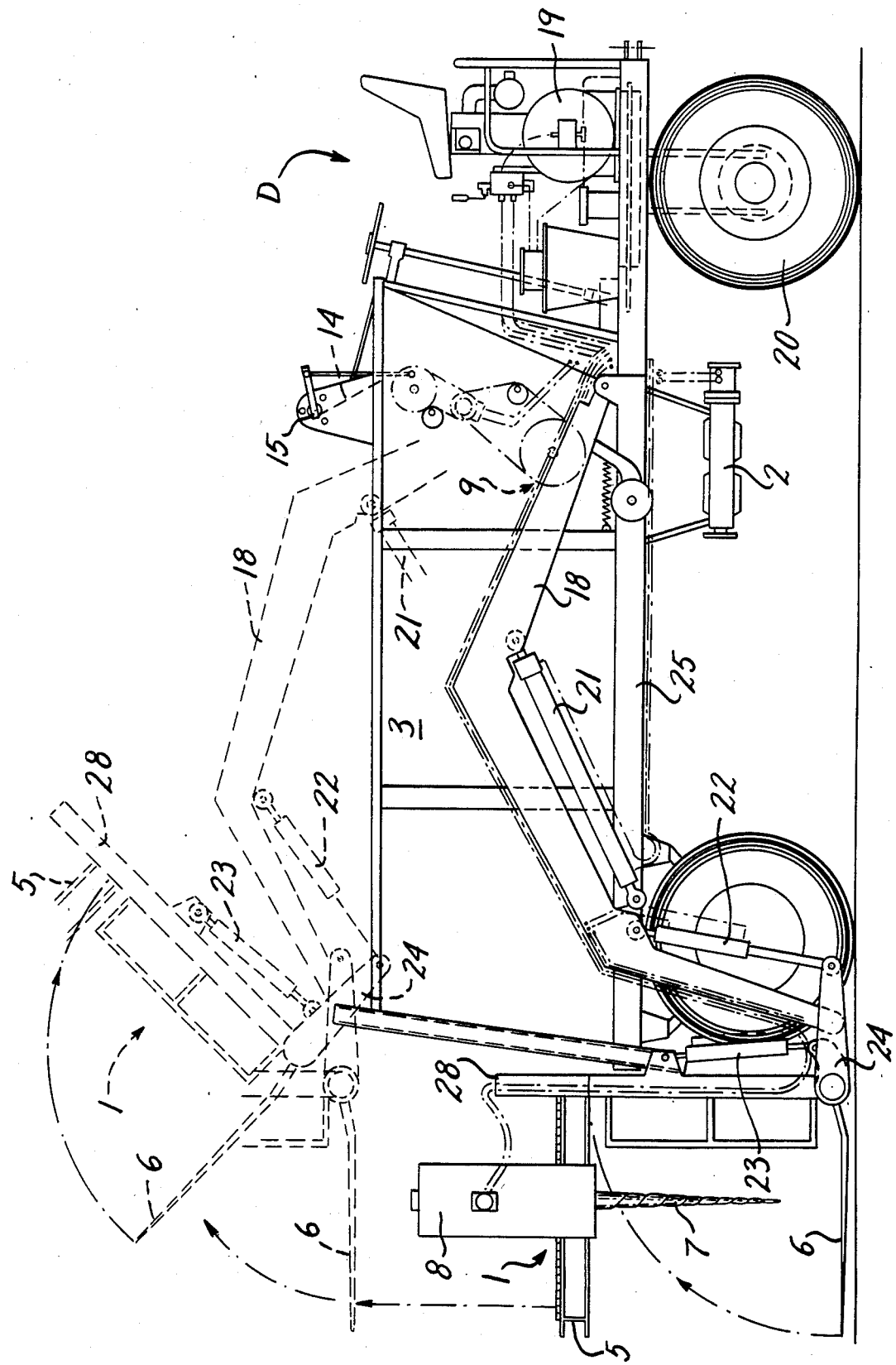
FIG. 1 is a side elevation of the pickup and delivery truck in accordance with the invention.

According to the figures, the pickup and delivery truck of the invention comprises a loading space 3 and a driver's position D which through a frame 25 are carried by three wheels. Disposed at the end of the loading space 3 remote from the driver's position is a silage cutter 1 which, with its prongs 6, also serves as pickup means. Beneath the driver's position is a drive wheel 20 which is steerable. Below the end of the loading space 3 near the driver's position, a conveying means 2 for the lateral discharge of the material is disposed. This arrangement enables the driver to control the vehicle with utmost precision even in tight spaces and also to closely watch the pickup and discharge operations.

Under the driver's seat is a hydraulic pump 19 which is driven by an internal-combustion engine and which, in addition to the hydraulic fluid for actuating the individual components of the truck of the invention, also supplies hydraulic fluid for the motion of the drive wheel 20.

The silage cutter 1 comprises a U-shaped bridge 5 on which a carriage 8 is displaceable which carries a knife 7 adapted to move up and down. The knife 7 is able to execute an oscillatory motion in the vertical direction and may be constructed as a sawing knife; however, it may also be constructed as a slicing knife which executes a cutting stroke after a particular feed motion of the carriage 8.

The silage cutter 1 further comprises horizontally extending prongs 6 parallel to and spaced from the bridge 5 approximately the length of the knife 7 on an open frame 28. With regard to further details of the silage cutter 1, reference is made to the Applicant's German Pat. No. 2,307,689, and a detailed description is therefore dispensed with.

Figure 2:
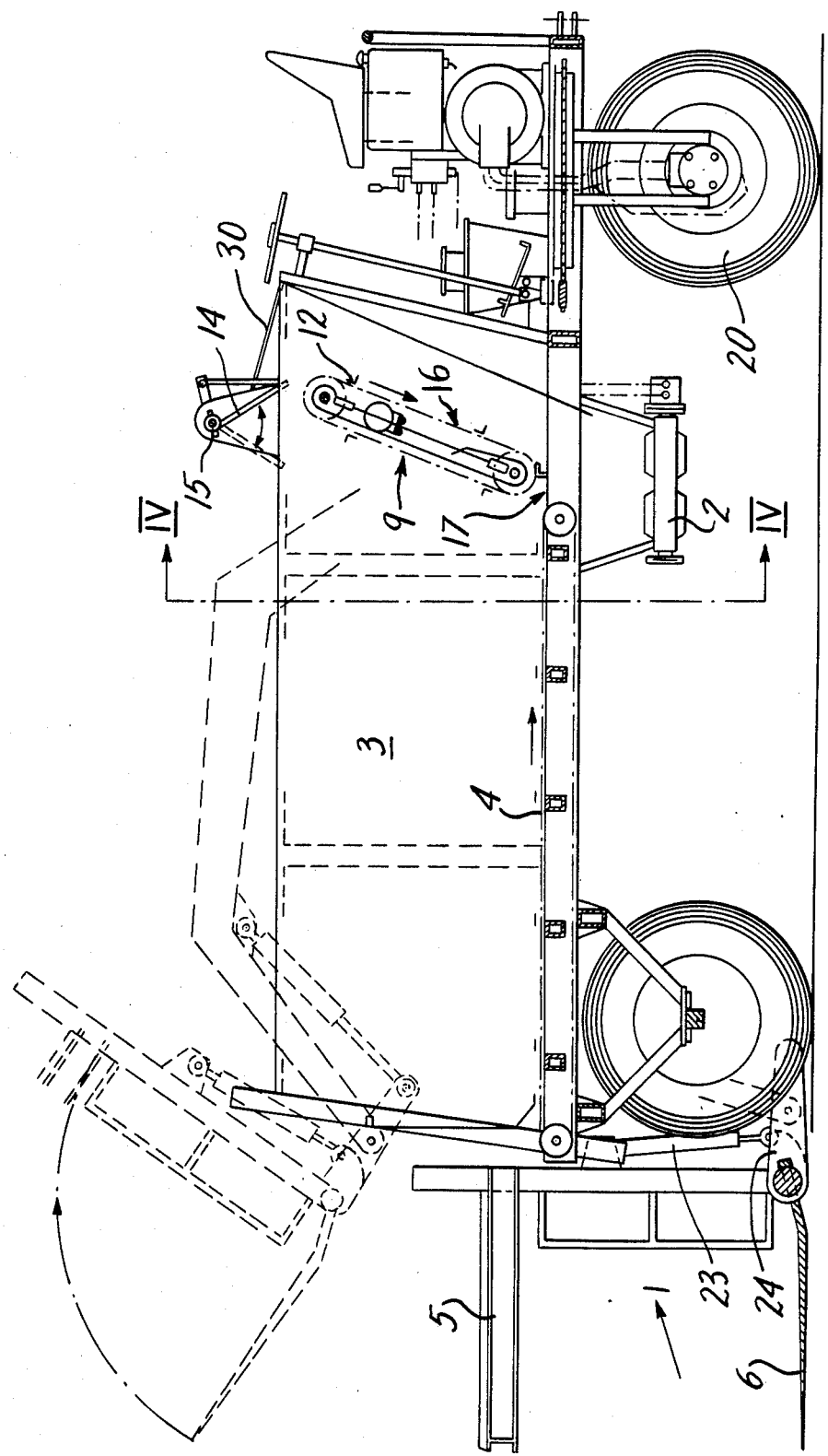
FIG. 2 is a longitudinal section through the truck.
Figure 3:
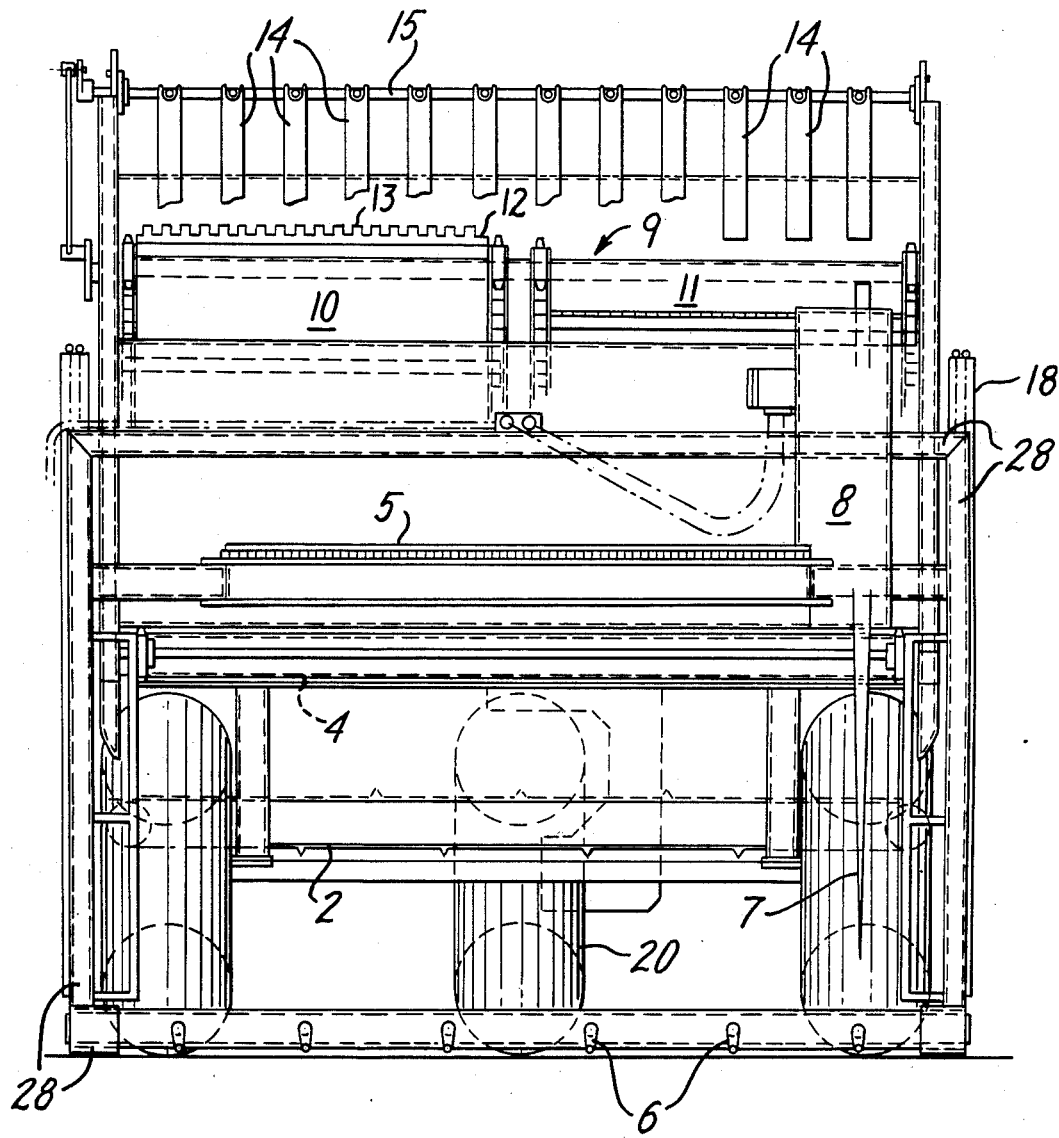
FIG. 3 is a view of the pickup side (front) of the truck of the invention.
Figure 4:
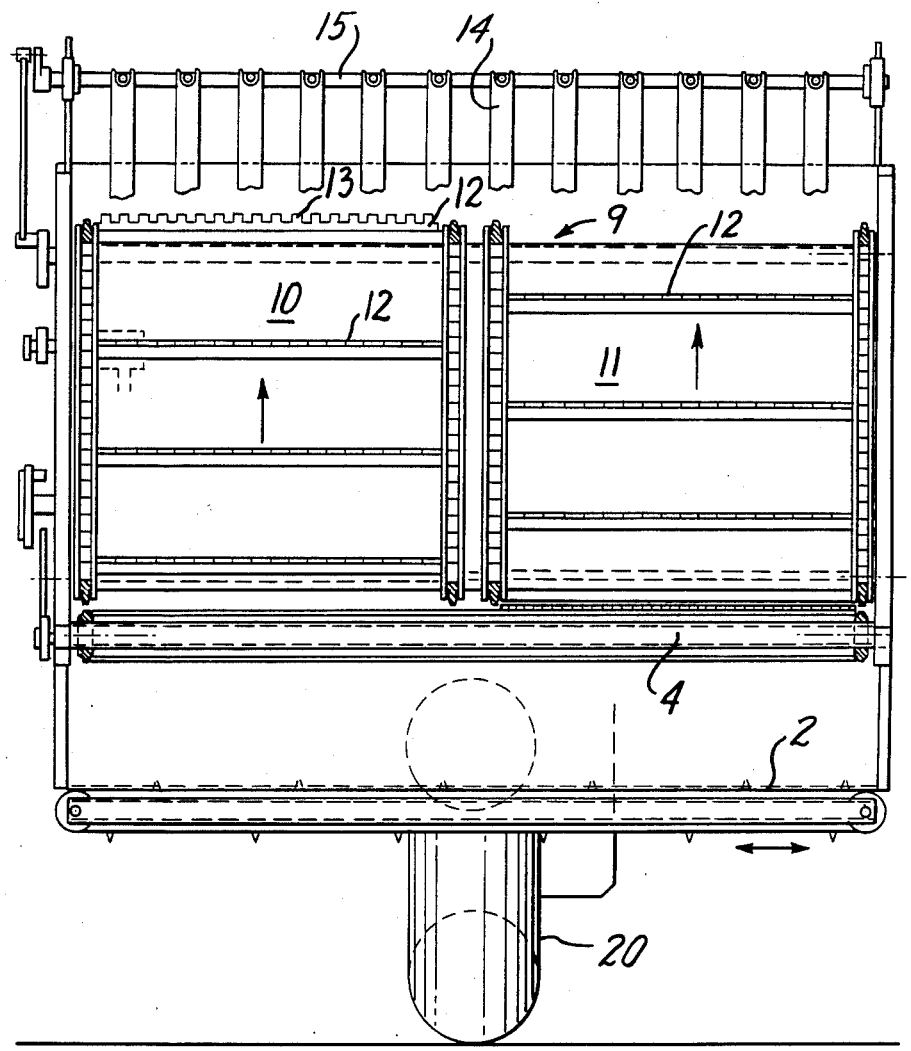
FIG. 4 is a partial cross-sectional view through the truck.

The silage cutter 1 is located at the forward end, as seen from the driver's position, of the loading space 3 which there is either partly or fully open. As indicated by dashed lines in FIGS. 1 and 2, it is adapted to be raised and tilted. Since the prongs 6 can also be tilted, they are capable of moving beyond the vertical into the area above the loading space 3 so that the silage blocks, large bales or the like which have been picked up can be reliably dumped into the loading space and no waste drops in front of the loading space.

At its end near the driver's position, the loading space 3 is provided with a discharge means 9 formed of two adjacent scraper conveyor belts 10 and 11 which are inclined upward and rearward. The rear bulkhead of the loading space near the driver's position is inclined correspondingly so that a conveying shaft 16 is formed between the scraper conveyor belts 10 and 11 and the bulkhead.

The floor of the loading space 3 is formed by a scraper feeder 4 which ends in front of the reversal points of the scraper conveyor belts 10 and 11 so that, between the latter and the scraper feeder 4, an opening 17 is created through which material handled that is not carried upwardly and into the conveying shaft 16 by the scraper conveyor belts is able to drop. Both the opening 17 and the conveying shaft 16 are disposed above the conveying means 2 which extends transversely and discharges sideways, and which may be a horizontally extending conveyor belt. The latter may be of the telescoping type and thus discharge also directly over troughs which are spaced somewhat from the pickup and delivery truck. But since the latter is highly maneuverable, the end of the conveyor belt or of the conveying means 2 can be securely run over and along troughs even when the latter are located directly alongside the truck.

The scraper conveyor belts 10 and 11 are provided with scraper strips 12 which extend in a direction transverse to the direction of motion of the conveyor belts and have teeth 13. These provide assurance that the material brought up by the scraper feeder 4 is actually carried upwardly and into the conveying shaft 16 by the belts. The scraper strips of the scraper feeder 4 are given a low profile to permit them to pass under the material accumulating in front of the discharge means 9.

Disposed above the discharge means 9 is a row of resilient tines 14 which are mounted on a shaft 15 oscillating in rotary motion. The tips of these tines move in front of the upper reversal point of the belts 10 and 11 to assure that no insufficiently chopper material which might clog the conveying shaft 16 is carried over the upper reversal point. The conveying shaft 16 is covered at the top by a metal sheet 30 that is inclined upward in the forward direction so that material chopped by the resilient tines 14 is forced down the conveying shaft 16.

The silage cutter 1 is mounted on hydraulically actuated rocking levers 24 which in turn are supported on control levers 18 extending alongside the loading space. The control levers 18 are hinged to the frame 25 near the driver's position, and hydraulic piston/cylinder units 21 for raising the control levers are articulated to the pickup end, the other ends of said units being pivotally secured to the control levers. Extending the piston of unit 21 permits the silage cutter 1 to be raised into the position indicated in the figures by dashed lines. By means of hydraulic piston/cylinder units 22 which are articulated to the rocking levers 24, the silage cutter 1 can then be pivoted to move the blocks or bales picked up into the area above the loading space 3. Through a further hydraulic piston/cylinder unit 23, the pickup prongs 6 can then be tilted relative to the bridge 5 and knife 7 beyond the vertical into the area over the loading space 3, which will cause the blocks or bales picked up to be dumped reliably into the loading space if they have not already slid into it over the prongs. After being pivoted, the prongs are in the plane of the U-shaped bridge 5 which because of its large opening cannot hinder the dumping operation. Thus it is possible not only to process blocks of a height corresponding to the spacing between the bridge 5 and the prongs 6 but also to pick up large bales whose diameter is not substantially greater than the overhang of the bridge 5.

After the material to be distributed has been dumped, the silage cutter is lowered and another pickup can be made until the loading space is filled. Then, when the distribution area is reached, delivery can be started.

It will be appreciated that the instant specification and claims are set forth by way of illustration and not of limitation, and that various changes and modifications may be made without departing from the spirit and scope of the present invention.

What is claimed is:

1. A pickup and delivery truck for handling cut blocks of material such as silage or straw wherein said truck comprises:
   (i) a loading space having scraper, feeder and conveying means for breaking up said blocks and laterally discharging said material therefrom;
   (ii) an open frame means carried at the front of said truck;
   (iii) means of forming said blocks comprising a horizontal U-shaped bridge means projecting from the upper portion of said open frame means;
   (iv) elongated knife means extending downwardly from said bridge means and movable therealong for cutting said blocks;
   (v) prong means for carrying a cut block, said prong means pivotably mounted to the lower portion of said frame means, said prong means positioned parallel to said bridge means and spaced therefrom a distance approximately equal to the length of said elongated knife means;
   (vi) means connected to the lower portion of said open frame means for raising said open frame means, bridge means, knife means and prong means as a unit above said loading space and for tilting said unit rearward toward said loading space; and
   (vii) separate means for pivoting said prong means upward towards the bridge means to aid discharge said cut block through said open frame means into said loading space.

2. A pickup and delivery truck according to claim 1, wherein the conveying means further comprise at least one scraper conveyor belt inclined upward and rearward of the loading space and having scraper strips with teeth arranged side by side.

3. A pickup and delivery truck according to claim 2, wherein the conveying means comprise two adjacent belts with scraper strips offset relative to one another.

4. A pickup and delivery truck according to claim 2 further comprising a plurality of downwardly directed resilient tines, said tines mounted on a shaft attached to said open frame means and disposed above said conveyor belt.

5. A pickup and delivery truck according to claim 4 further comprising a shaft which executes an oscillating rotary motion for supporting said tines.

6. A pickup and delivery truck according to claim 2 comprising a conveying shaft leading downwardly from the upper reversal point of said scraper conveyor belt to said conveying means.

7. A pickup and delivery truck according to claims 2, further comprising an opening between the lower reversal point of said scraper conveyor belt and the reversal point of the loading space for passing materials to said conveying means.

8. A pickup and delivery truck according to claim 1, wherein the truck comprises a hydraulically operated drive wheel, a hydraulic control actuating means, a rocker lever prong means, and a pump driven by an internal combustion engine, said pump driving said drive wheel, said hydraulic control actuating means, and said rocker lever.

* * * * *